United States Patent
Ray et al.

(10) Patent No.: US 12,534,566 B2
(45) Date of Patent: *Jan. 27, 2026

(54) POLY(THIOPHENE-CO-BENZOTHIOPHENE-CO-DIBENZOTHIOPHENE) COPOLYMERS AND PROCESS FOR PREPARATION THEREOF

(71) Applicant: Council of Scientific and Industrial Research, New Delhi (IN)

(72) Inventors: Anjan Ray, Uttarakhand (IN); Thangaraj Senthilkumar, Uttarakhand (IN); Vedant Joshi, Uttarakhand (IN); Amod Kumar, Uttarakhand (IN); Umesh Kumar, Uttarakhand (IN); Sudip Kumar Ganguly, Uttarakhand (IN)

(73) Assignee: Council of Scientific and Industrial Research, New Delhi (IN)

( * ) Notice: Subject to any disclaimer, the term of this patent is extended or adjusted under 35 U.S.C. 154(b) by 560 days.

This patent is subject to a terminal disclaimer.

(21) Appl. No.: 18/064,529

(22) Filed: Dec. 12, 2022

(65) Prior Publication Data

US 2023/0203240 A1     Jun. 29, 2023

(30) Foreign Application Priority Data

Dec. 25, 2021  (IN) .............................. 202111061088

(51) Int. Cl.
    *C08G 61/12*     (2006.01)
(52) U.S. Cl.
    CPC ....... *C08G 61/126* (2013.01); *C08G 2261/22* (2013.01); *C08G 2261/3223* (2013.01); *C08G 2261/40* (2013.01); *C08G 2261/522* (2013.01)

(58) Field of Classification Search
    CPC .............. C08G 61/126; C08G 2261/22; C08G 2261/3223; C08G 2261/40; C08G 2261/522
    See application file for complete search history.

(56) References Cited

U.S. PATENT DOCUMENTS

| | | | |
|---|---|---|---|
| 4,987,042 | A | 1/1991 | Jonas et al. |
| 5,354,836 | A | 10/1994 | Samulski et al. |

(Continued)

FOREIGN PATENT DOCUMENTS

| | | |
|---|---|---|
| CN | 102260370 B | 1/2013 |
| CN | 103833977 A | 6/2014 |
| EP | 1 329 475 A1 | 7/2003 |

*Primary Examiner* — Shane Fang
(74) *Attorney, Agent, or Firm* — Knobbe, Martens, Olson & Bear, LLP

(57) ABSTRACT

A copolymer, poly(thiophene-co-benzothiophene-co-dibenzothiophene), and method of preparation thereof. The copolymer, poly(thiophene-co-benzothiophene-co-dibenzothiophene), having a formula (I):

Formula (1)

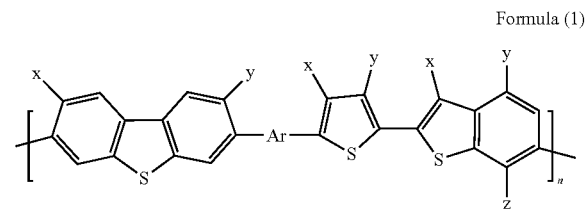

wherein x=H or R, y=H or R, z=H or R, and n=500-58000, wherein R is selected from alkyl or alicyclic chain substituents, and Ar is an aromatic ring.

11 Claims, 21 Drawing Sheets

(56) References Cited

U.S. PATENT DOCUMENTS

| | | |
|---|---|---|
| 6,602,974 B1 | 8/2003 | McCullough et al. |
| 7,982,212 B2 | 7/2011 | Suzuki et al. |
| 2005/0009986 A1 | 1/2005 | Groenendaal et al. |
| 2009/0163693 A1* | 6/2009 | Kim ..................... C09K 11/06 |
| | | 528/212 |

* cited by examiner

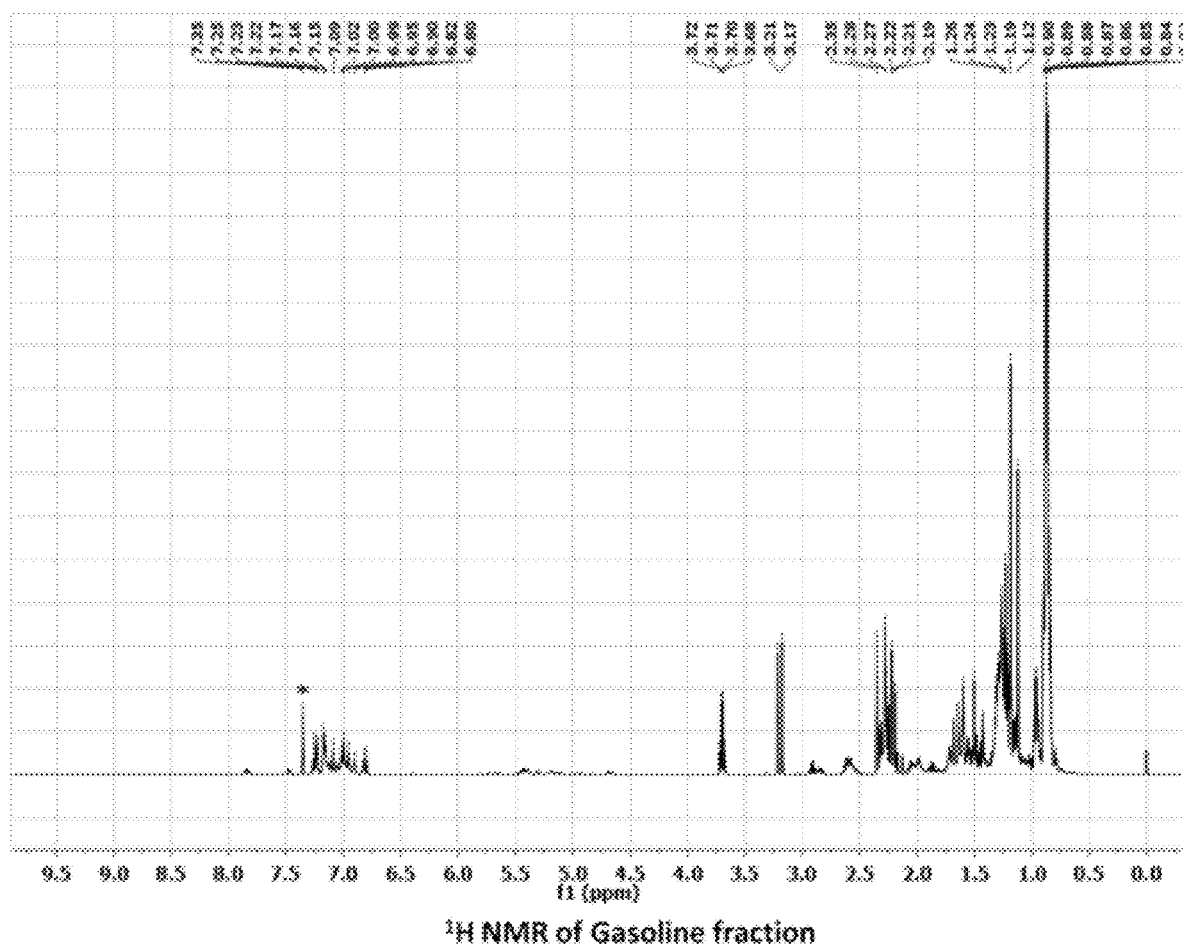
Figure: 1

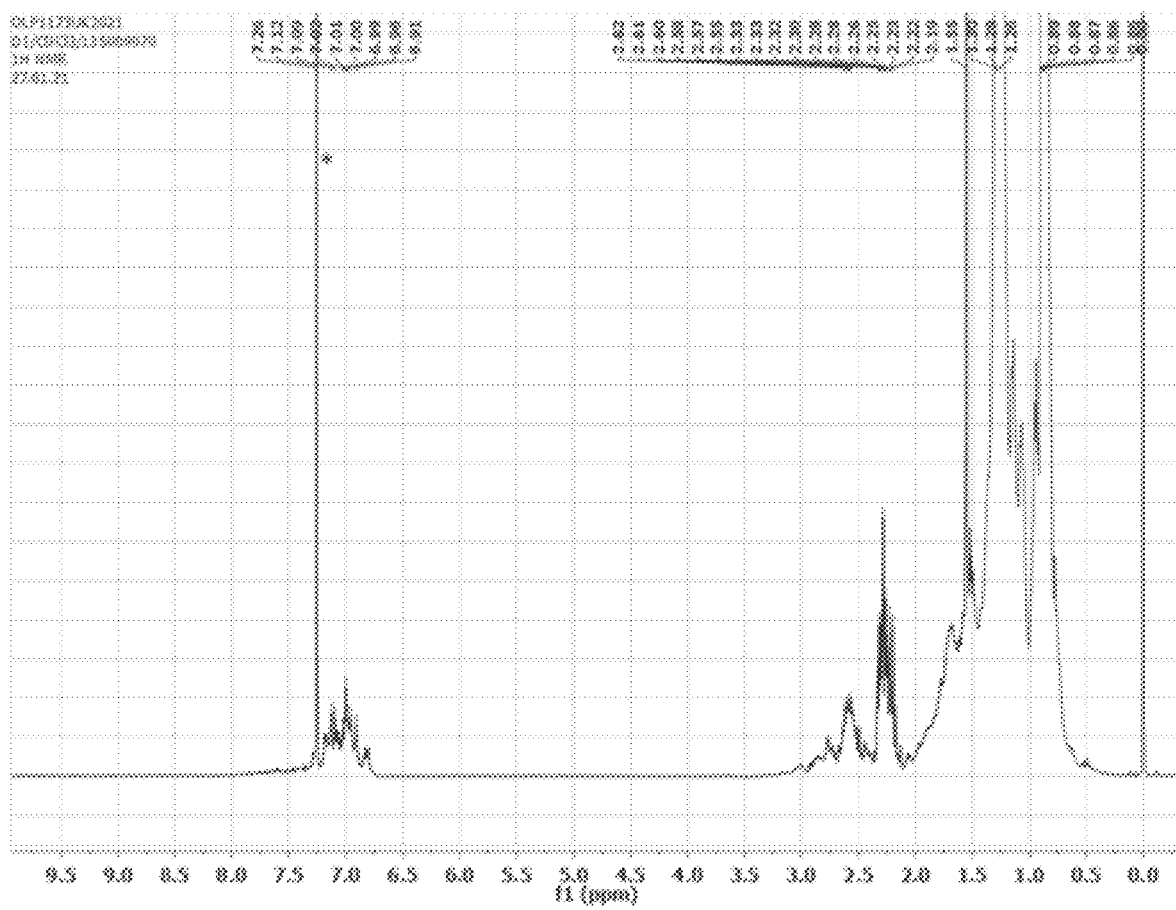
¹H NMR of Diesel fraction
Figure: 1 contd.

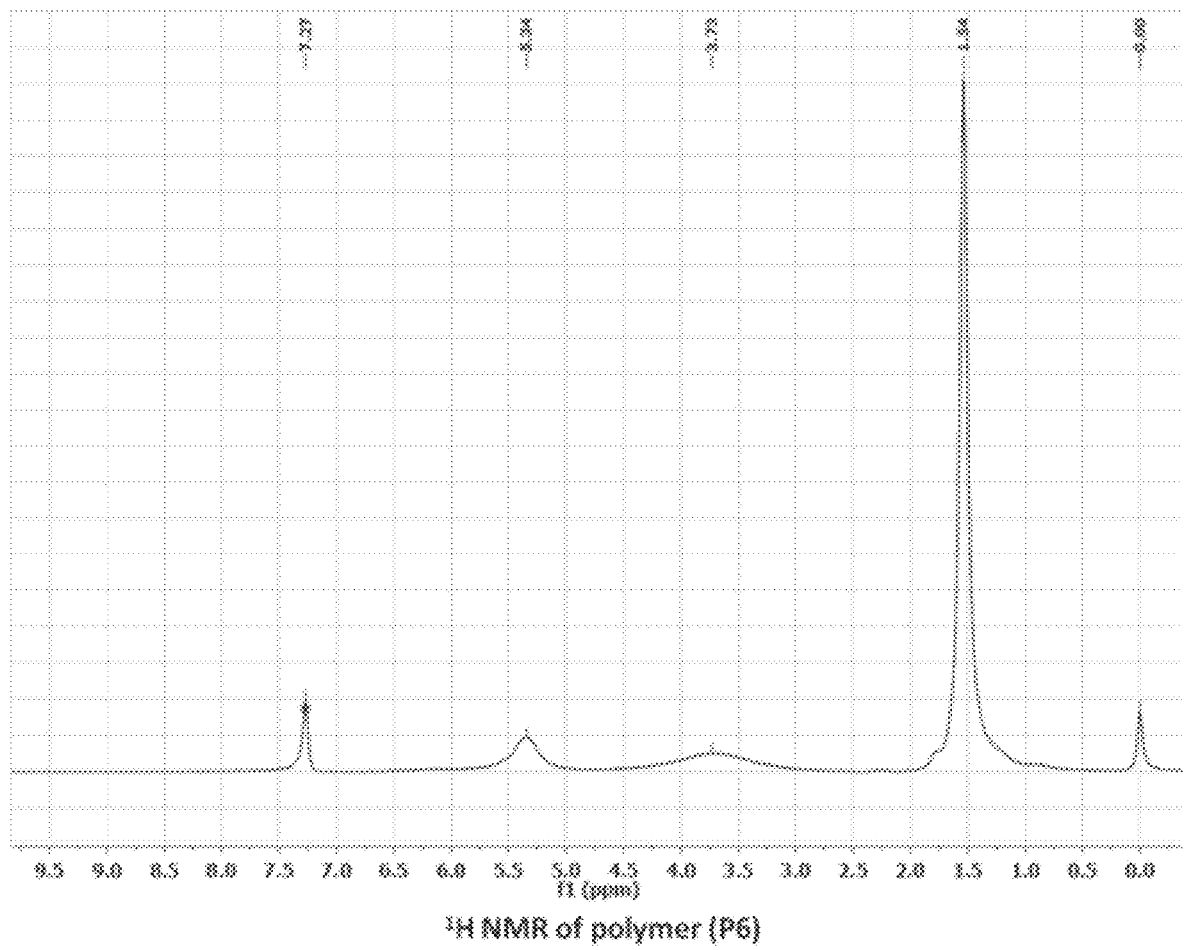
Figure: 1 contd.

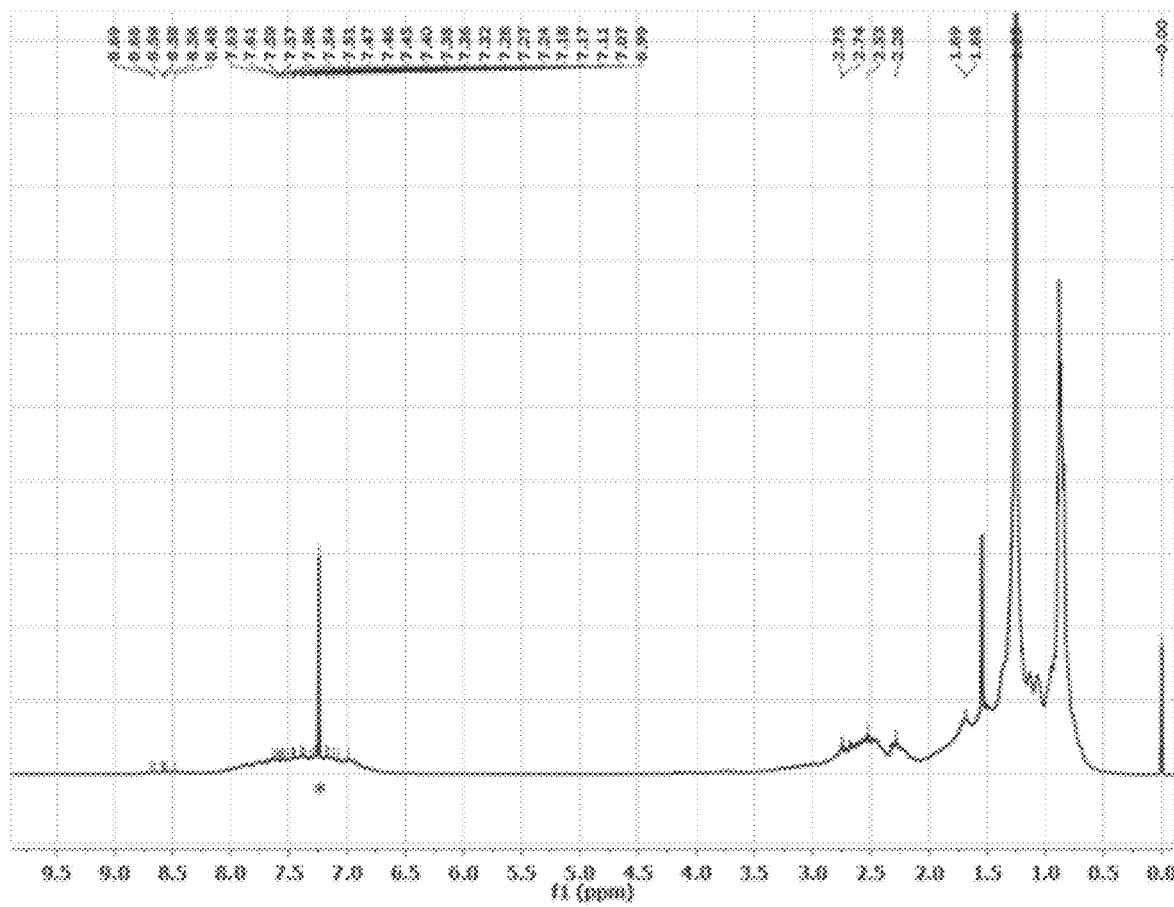
Figure: 1 cont'd.

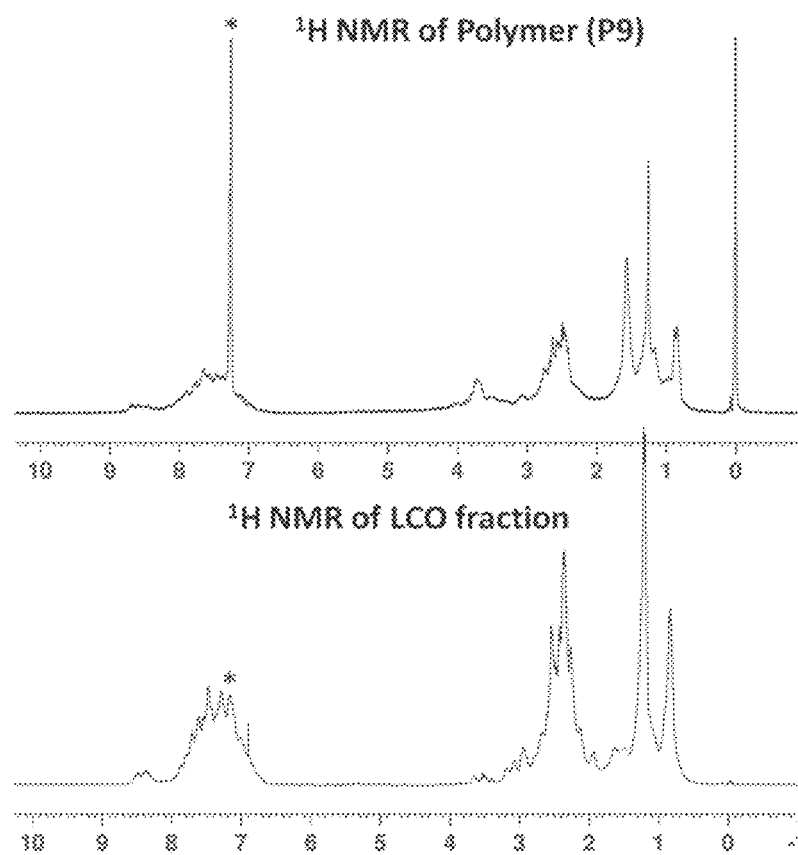
Figure: 2

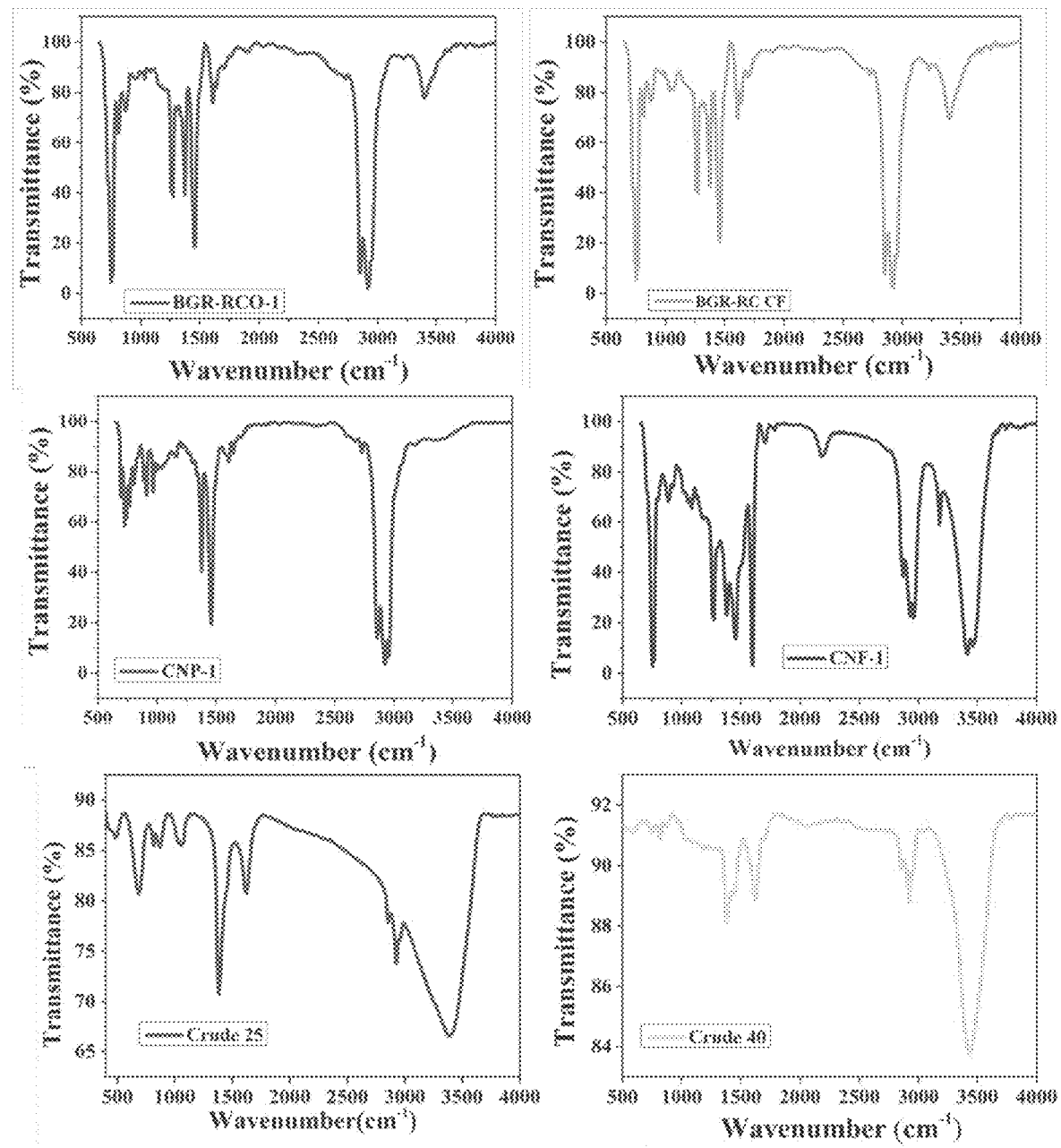
Figure: 3

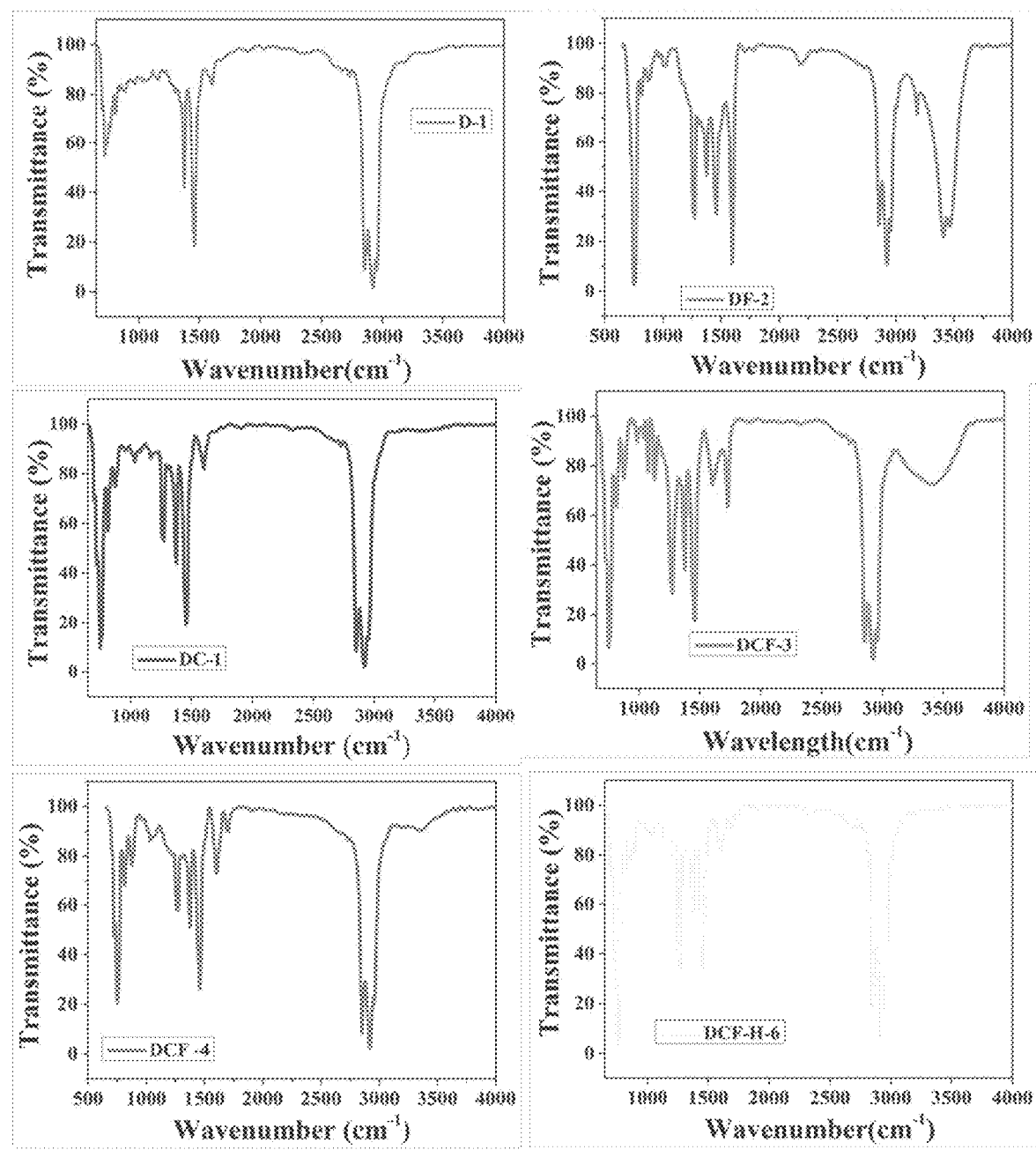
Figure: 3 cont'd

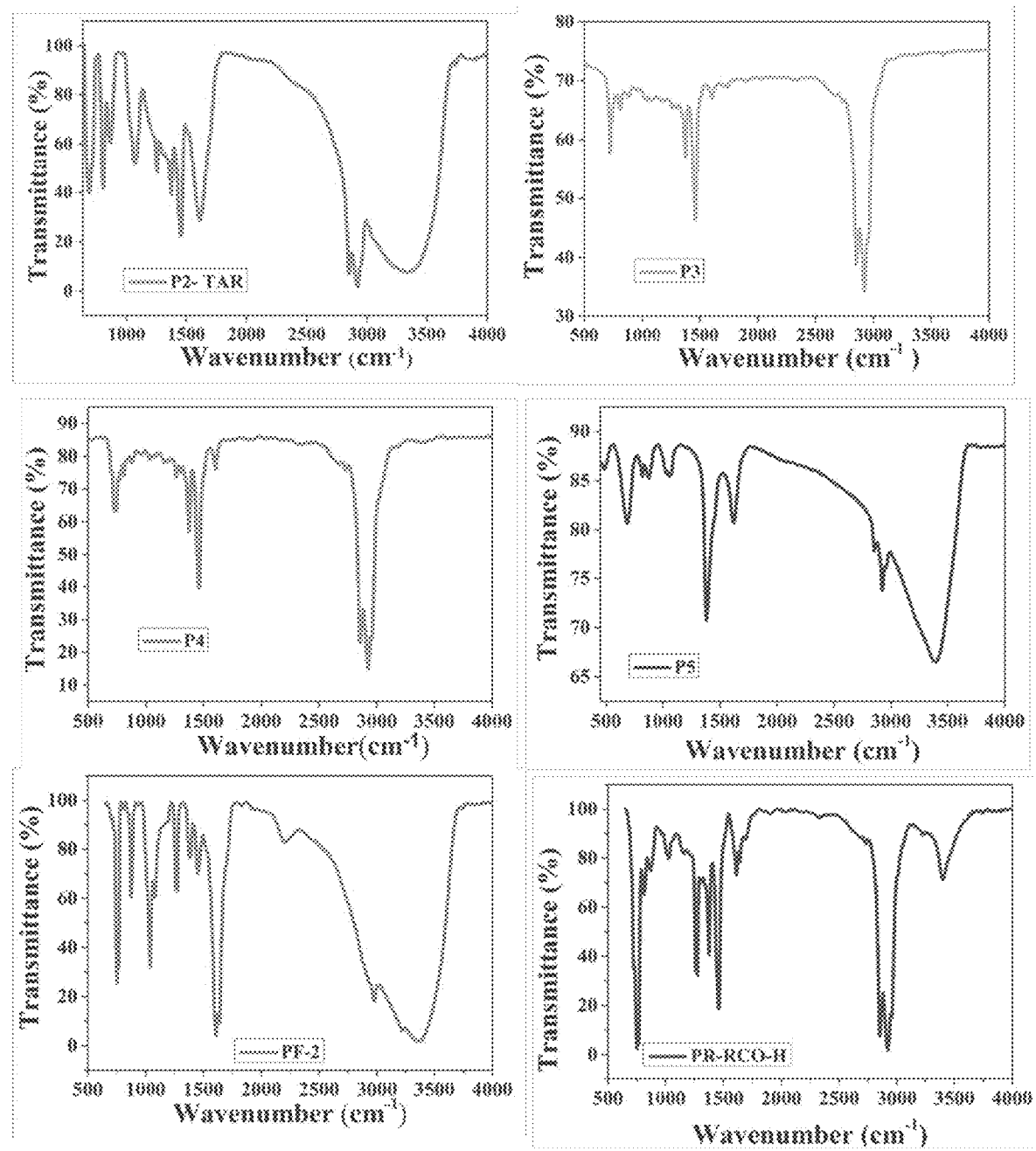
Figure: 4

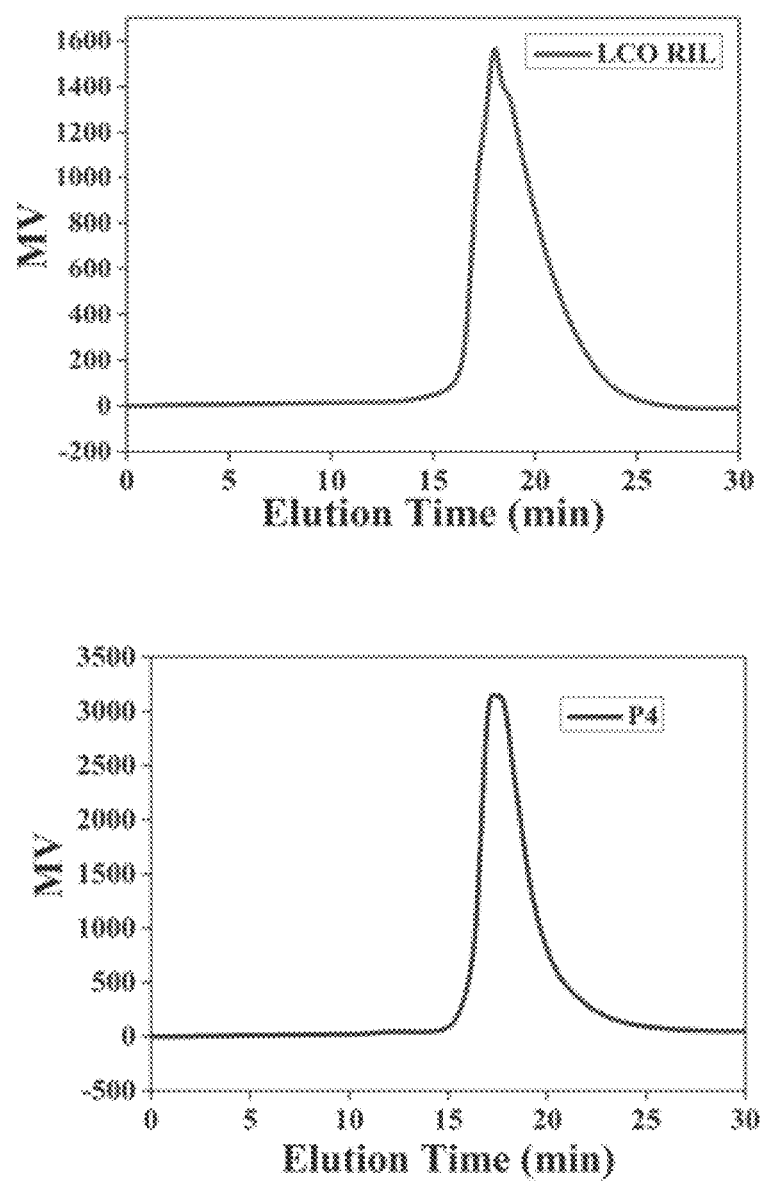
Figure 5 contd.

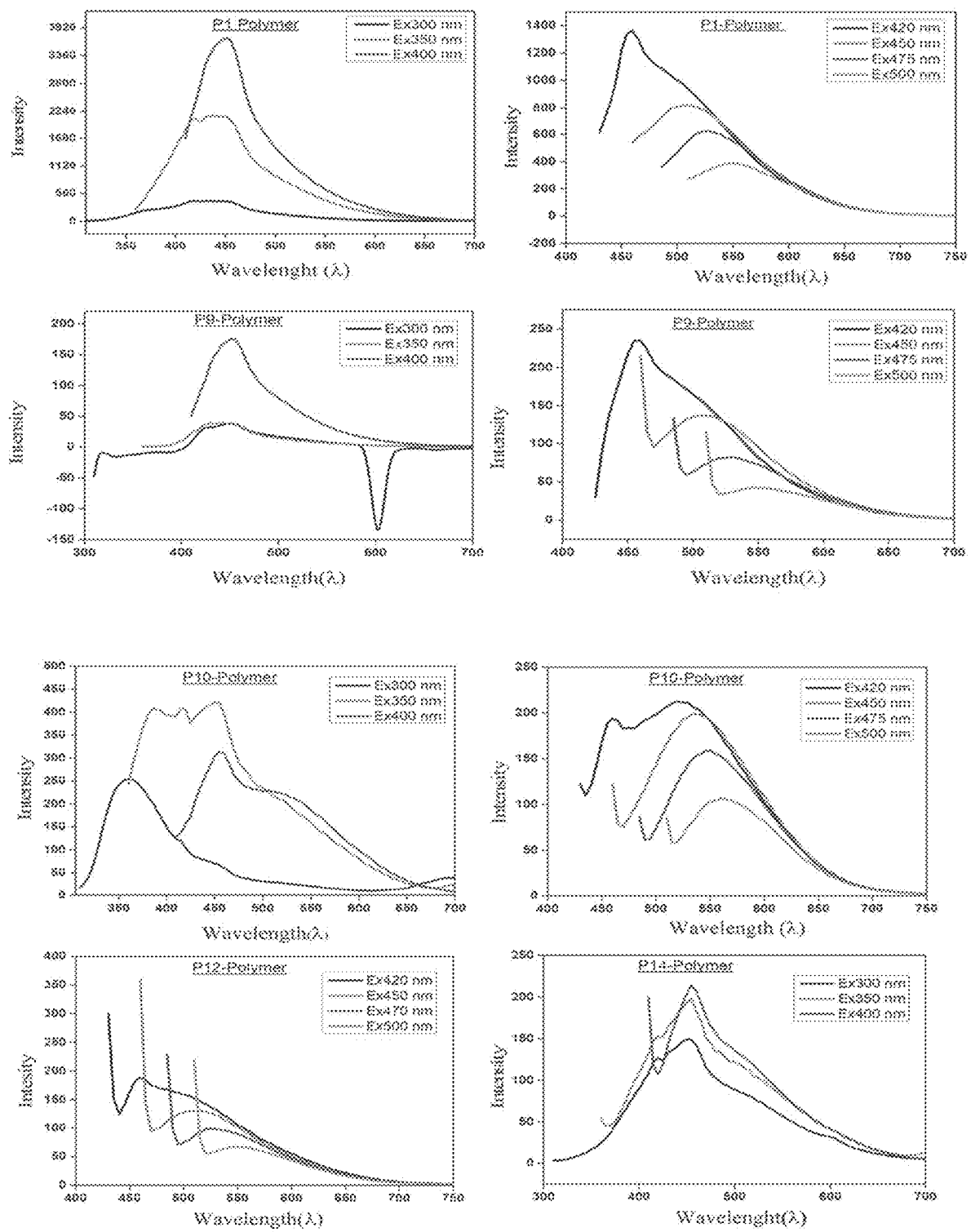
Figure: 7

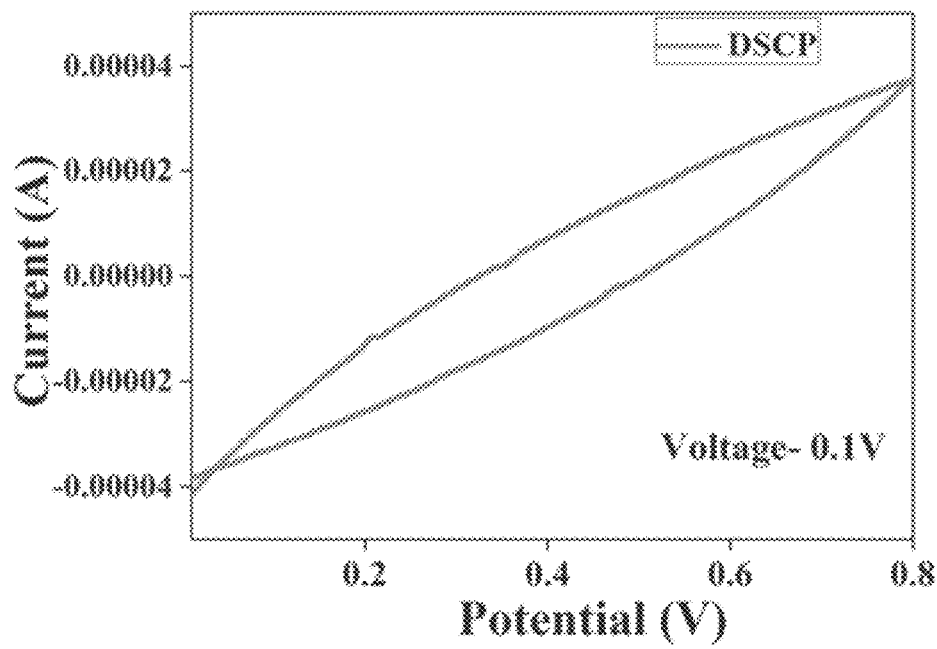
Solvent – THF, Electrolyte – tetrabutyl per chlorate, Voltage – 0.1 V
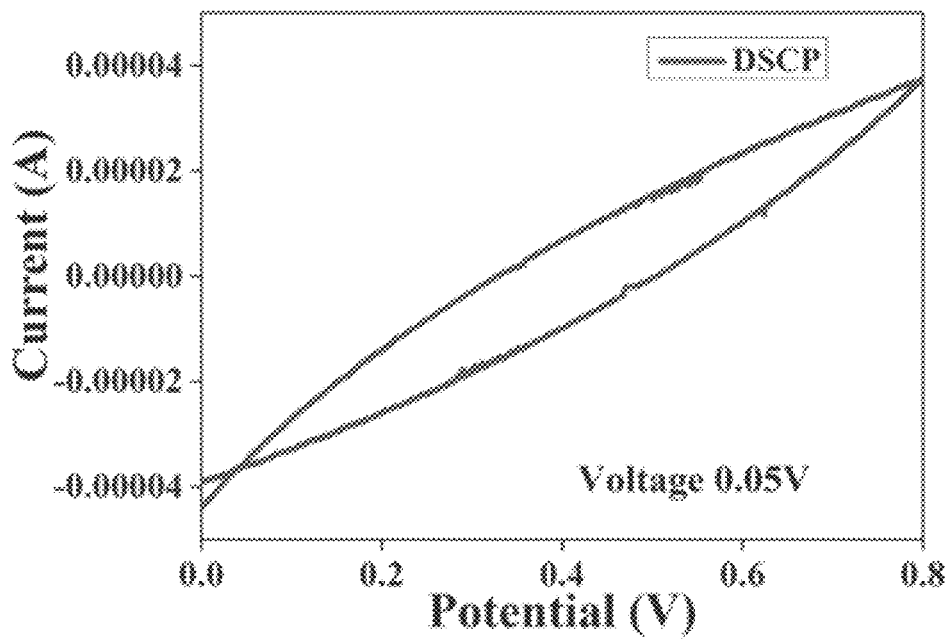
Solvent – THF, Electrolyte – tetra butyl ammonium per chlorate, Voltage – 0.05 V
Figure 7 cont'd

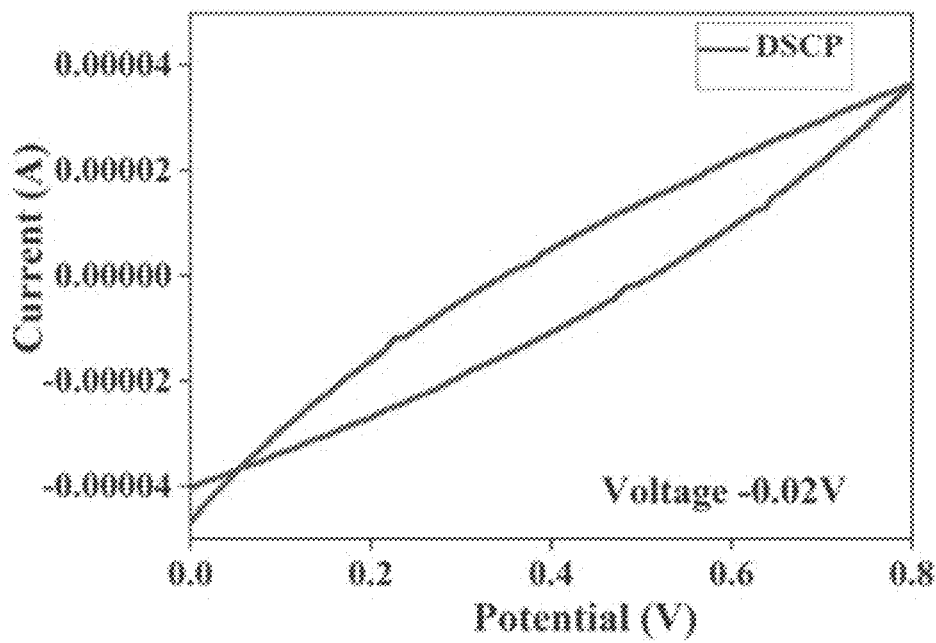
Solvent – THF, Electrolyte – tetra butyl ammonium per chlorate, Voltage – 0.02 V
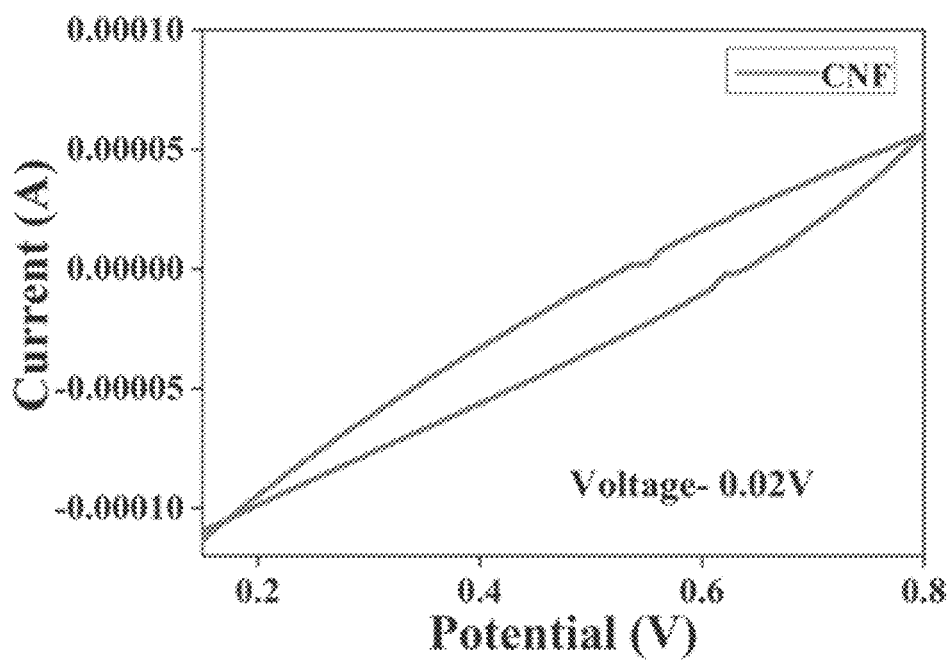
Solvent – THF, Electrolyte – tetra ammonium per chlorate, Voltage – 0.02 V
Figure 7 cont'd

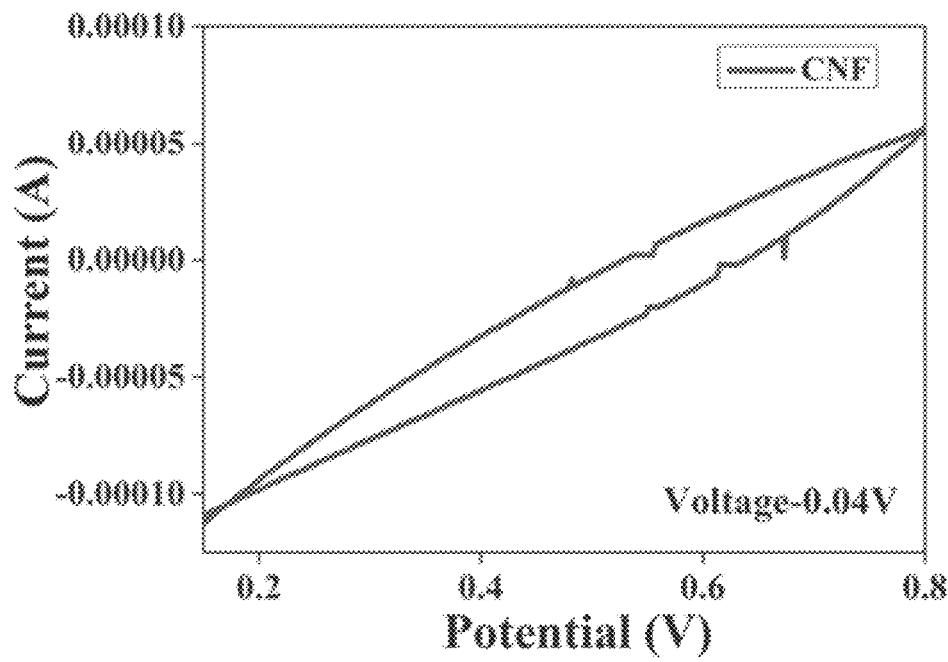
Solvent – THF, Electrolyte – tetra butyl ammonium per chlorate, Voltage – 0.04 V
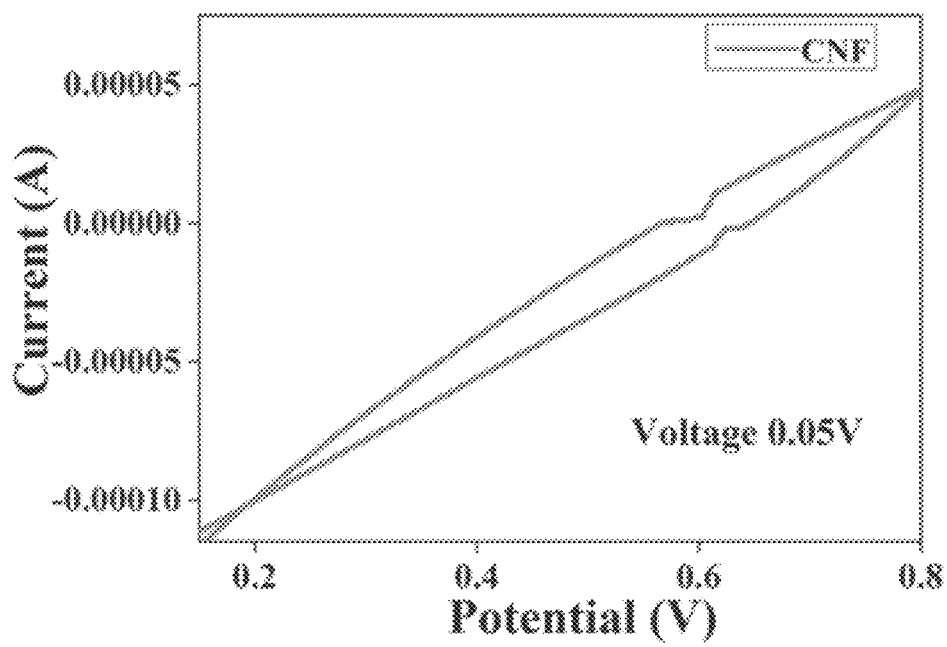
Solvent – THF, Electrolyte – tetra butyl ammonium per chlorate, Voltage – 0.05 V
Figure 7 cont'd

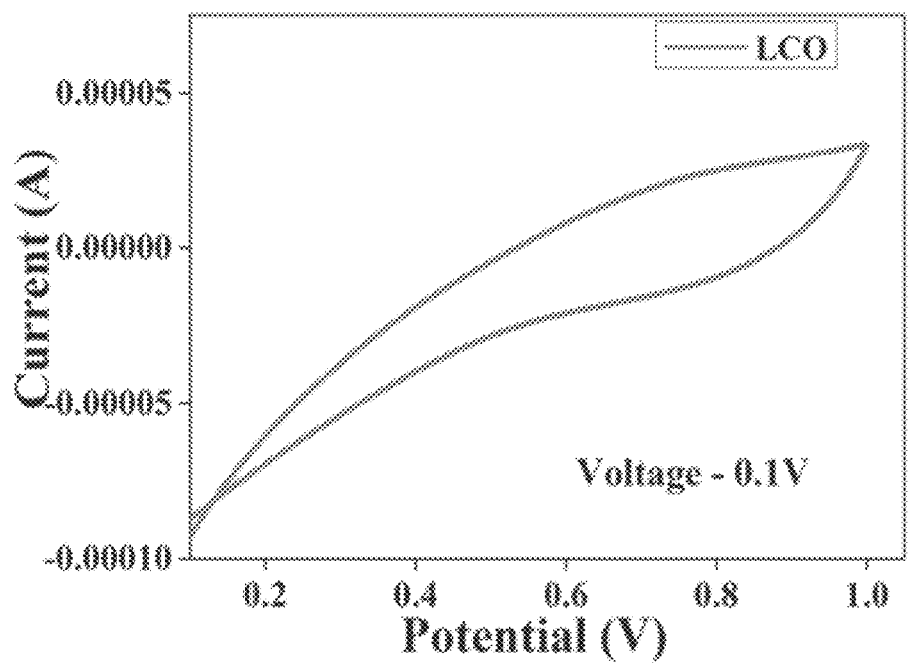
Solvent – THF, Electrolyte – Tetra butyl ammonium per chlorate, Voltage – 0.1 V
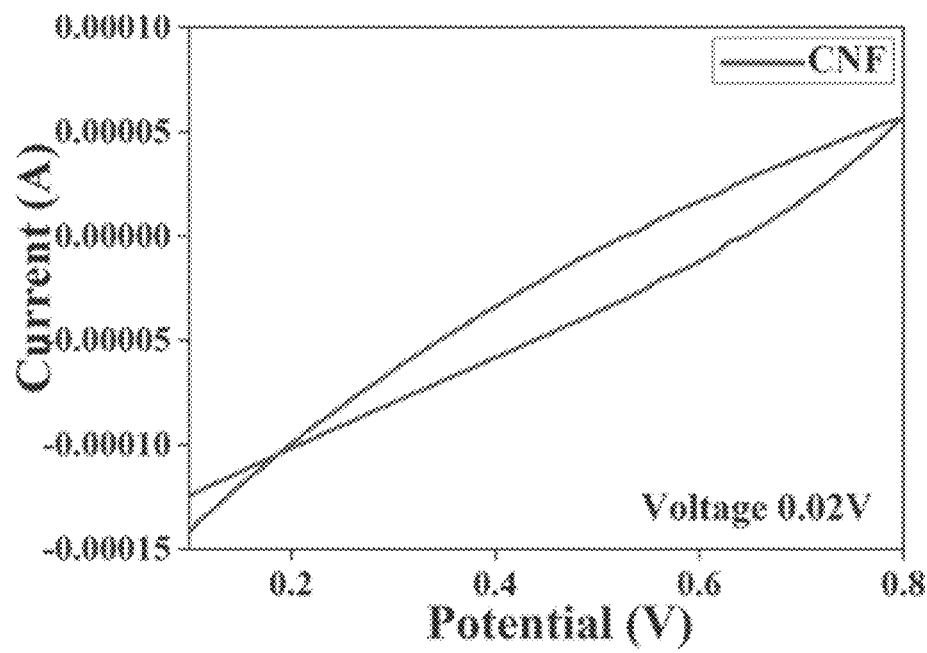
Solvent – THF, Electrolyte – Tetra butyl ammonium per chlorate, Voltage – 0.02 V
Figure 7 cont'd

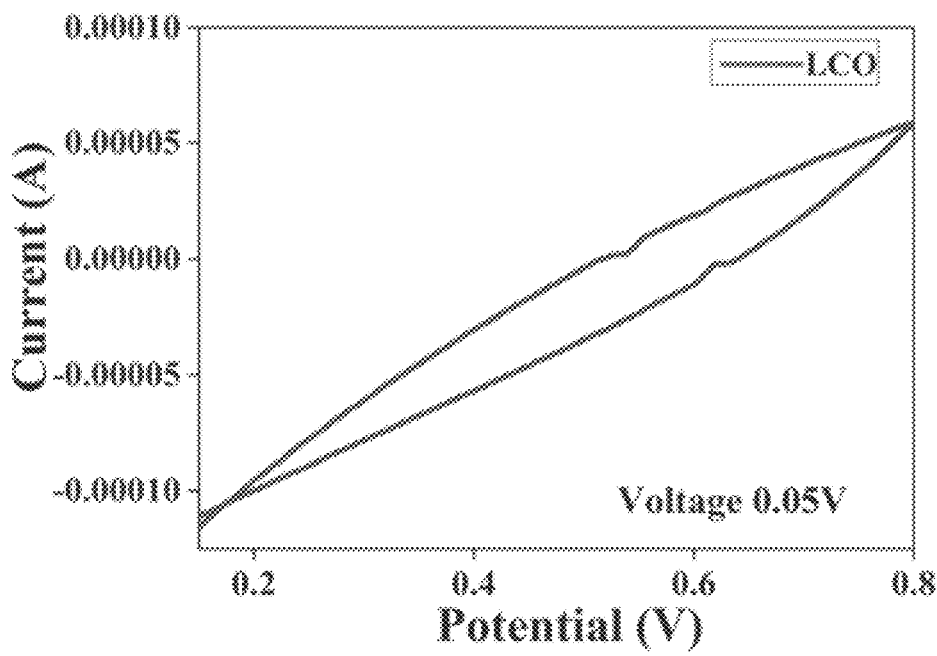
Solvent – THF, Electrolyte – Tetra butyl ammonium per chlorate, Voltage – 0.05 V
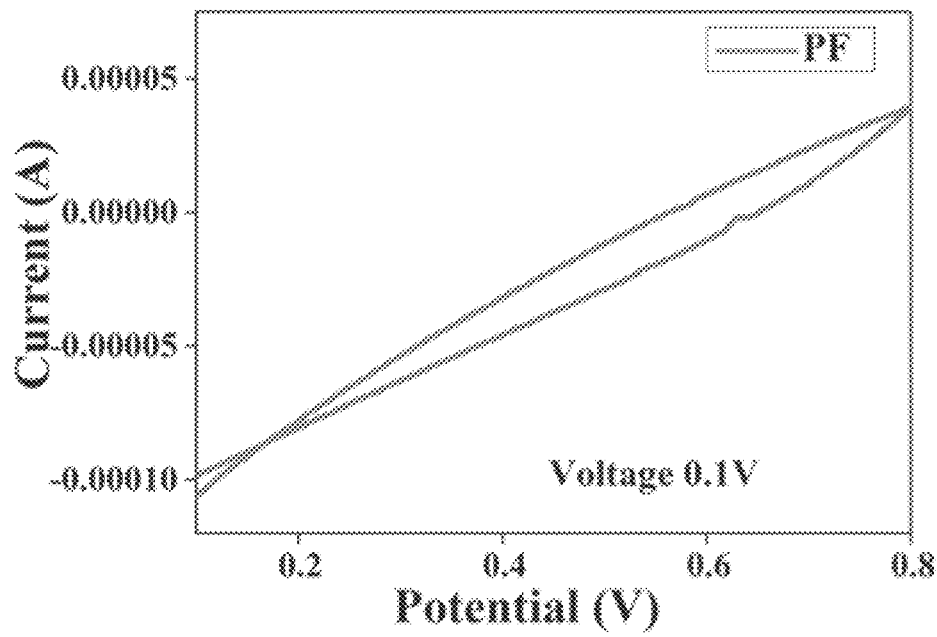
Solvent – THF, Electrolyte – Tetra butyl ammonium per chlorate, Voltage – 0.1 V
Figure 7 cont'd

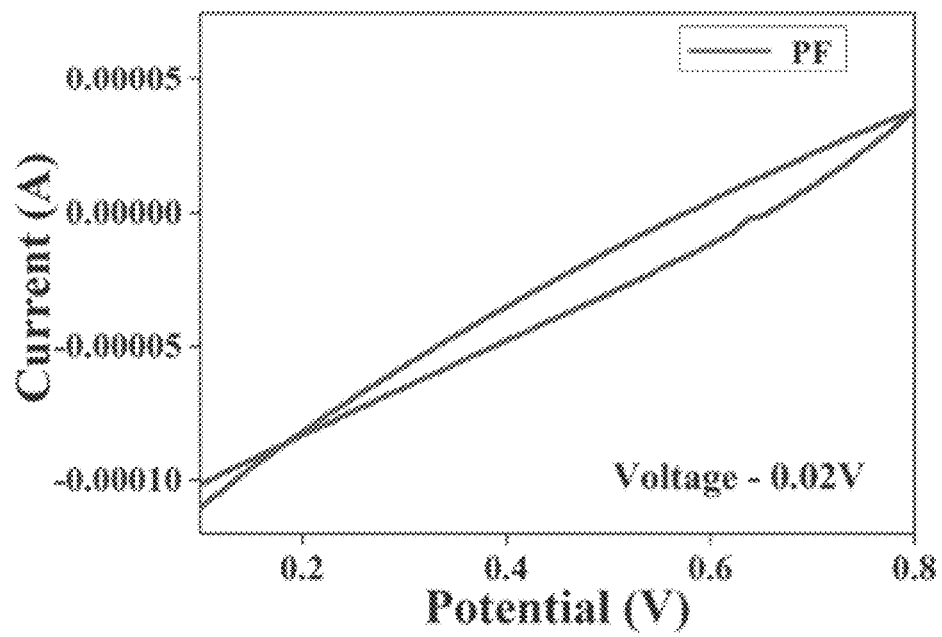
Solvent – THF, Electrolyte – Tetra butyl ammonium per chlorate, Voltage – 0.02 V
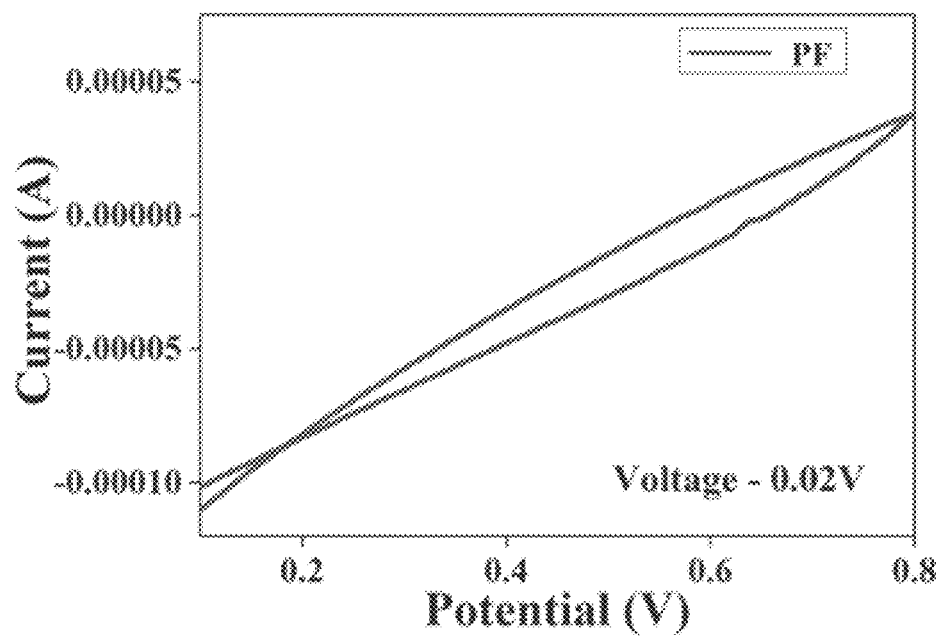
Solvent – THF, Electrolyte – Tetra butyl ammonium per chlorate, Voltage – 0.02 V
Figure 7 cont'd

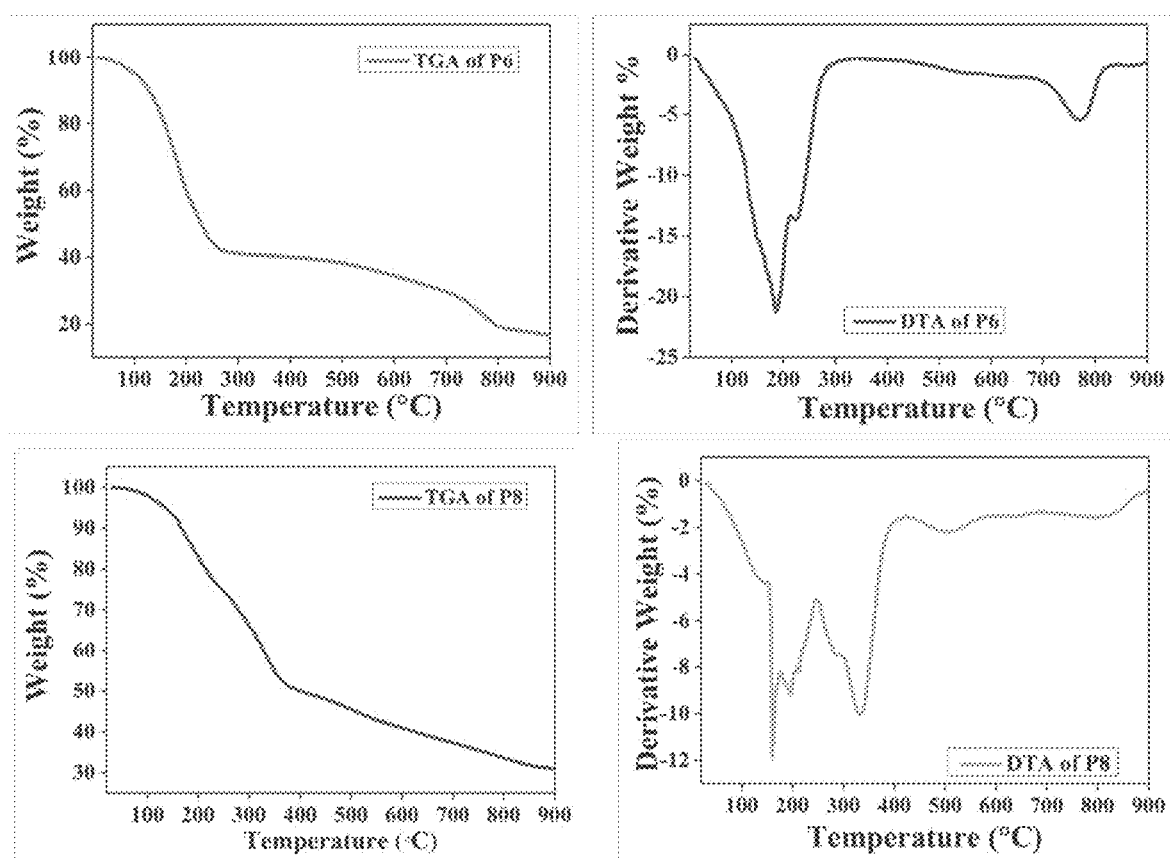
Figure: 8

POLY(THIOPHENE-CO-BENZOTHIOPHENE-CO-DIBENZOTHIOPHENE) COPOLYMERS AND PROCESS FOR PREPARATION THEREOF

RELATED APPLICATION

This application claims the benefit of Indian Application No. 202111061088, filed Dec. 25, 2021, which is hereby expressly incorporated by reference in its entirety.

TECHNICAL FIELD

The present disclosure relates to heterocyclic aromatic copolymers and process for preparation thereof. More specifically, the disclosure describes a process for preparation of versatile aromatic copolymers containing thiophene, benzothiophene, and dibenzothiophene rings from petroleum crude oil or from various petroleum refinery fractions including, but not limited to, naphtha, gasoline, kerosene, diesel, light cycle oil (LCO), vacuum gas oil (VGO), heavy residue oil (HRO), foots oil, fuel oil, and vis breaker tar (VisTar) streams. Notably, the present disclosure relates to a new family of copolymers, namely poly(thiophene-co-benzothiophene-co-dibenzothiophene), with or without aliphatic and alicyclic side chains.

BACKGROUND

Numerous polythiophenes, polybenzothiophenes, and their variants and copolymers have been reported in the prior art due to their interesting electrical and optical properties.

Reference may be made to U.S. Pat. No. 4,987,042, wherein a new type of polythiophenes prepared by oxidative polymerization, which exhibit high electrical conductivity and imparting antistatic properties on substrates. The oxidants polymerizing the corresponding thiophene include Fe(III) persulfate, $H_2O_2$, $FeCl_3$, and Fe(III)perborates.

Reference may be made to U.S. Pat. No. 5,354,836, wherein the high-performance aromatic polymers containing thiophene rings disclosed. Poly(arylene ether ketone) of the formula [AB] wherein A comprises an aromatic diphenol having at least one aromatic ring; B comprises an aromatic ketone unit containing two thiophene rings were prepared. Functional moieties A and B are covalently linked to each other.

Reference may be made to US20050009986 A1, wherein new 3,4-alkylenedioxythiophene copolymers which exhibit high electrical conductivities, high visible light transmittances, and good processability in organic solvents disclosed. Additionally, the thiophene-based polycations and polyanions exhibit water solubility at 25° C.

Reference may be made to U.S. Pat. No. 6,602,974 B1, wherein synthesizing polythiophenes, particularly regio-regular head-to-tail poly(3-alkyl thiophene) (HT PATs) and block copolymers described. The intrinsically conductive diblock and triblock copolymers, formed from the HT-PATs, have excellent conductivity and low polydispersities useful for conductivity and field-effect transistors.

Reference may be made to EP1329475 B1, wherein disclosure relates to the use of polythiophenes copolymers. Here polythiophenes copolymers have side chains with repeating thienylene units on the polythiophene backbone arranged in a regioregular manner. These polythiophenes are useful as active semiconducting materials for thin-film field-effect transistors (FETs).

Reference may be made to CN103833977 A, wherein synthesis of benzothiophene-silole di(diazosulfide) copolymers described. The synthesized copolymers are useful in polymer-based solar batteries and also for organic electroluminescent apparatuses. CN102260370 B discloses the synthesis of benzothiophene unit-containing perylene diimide copolymer, which has good solubility, high absorbance, wide absorption range capable of extending to a near-infrared region, and reasonable charge transfer property, and also improves the utilization rate of sunlight.

Reference may be made to U.S. Pat. No. 7,982,212 B2, wherein disclosure discloses the synthesis of various copolymers, including alkyl chain substituted dibenzothiophene, which was used as an active layer in light-emitting diodes. In the disclosure, the substituted chains were linear, branched, or cyclic, the carbon number from 1 to 20 alkyl group, alkoxy group, alkylthio group, aryl group, aryloxy group, arylthio group, arylalkyl group, arylalkoxy group, arylalkylthio group, aryl alkenyl group, aryl alkynyl group, amino group, substituted amino group, silyl group, a substituted silyl group, halogen atom, acyl group, acyloxy group, imine residue, amide group, acid imide group, monovalent heterocyclic group, carboxyl group, a substituted carboxyl group, nitro group, and cyano group.

All the references described above illustrated the synthesis of various thiophene-based polymers and copolymers made from commercial and purified monomers. There is no report or literature on developing thiophene-based polymers and copolymers from petroleum crude oils and petroleum refinery fractions. Moreover, the aromatic sulfur compounds in the petroleum crude oils and petroleum refinery fractions are challenging to desulfurize via conventional techniques such as hydrodesulfurization (HDS) and oxidative desulfurization (ODS) processes. HDS and ODS are generally energy-intensive and capital-intensive and generate toxic and environmentally unacceptable gaseous effluents such as hydrogen sulfide ($H_2S$), sulfur oxides ($SO_x$), etc., that require additional processing, capital investment, and energy. Hence, there is a need to develop a method and synthetic protocol to remove sulfur from petroleum-derived streams by other, less energy-intensive means, such as synthesizing thiophene-based polymers and copolymers from petroleum crude oils and petroleum refinery fractions.

Sulfur-Containing Heterocyclic Aromatic compounds are abbreviated to "SCHAC" and referred to by this acronym in the remainder of this disclosure. It is an object of the present disclosure to provide a new class of functionally active copolymers obtained from SCHAC contained in petroleum crude oil and refinery fractions, analogous to those mentioned above SCHAC-derived aromatic polymers reported in the prior art, but where the novel copolymers that form the subject of this disclosure have different and adjustable physical, chemical, and processing characteristics as compared to previously reported heterocyclic sulfur-containing aromatic polymers to expand the range of applications for these types of materials. Therefore, synthesizing functionally active (e.g., conducting) copolymers from sulfur monomers present in petroleum crude oil itself or in refinery fractions including, but not limited to naphtha, gasoline, kerosene, diesel, LCO, VGO, HRO, foots oil, fuel oil, and VisTar streams and different crude oils, etc. potentially offers substantial value in petroleum industries.

SUMMARY

In an embodiment of the present disclosure, the present disclosure provides a novel class of functionally active copolymers poly(thiophene-co-benzothiophene-co-dibenzothiophene), abbreviated to the generic term Copoly-SCHAC, obtained from petroleum crude oil and refinery fractions such as naphtha, gasoline, kerosene, diesel, LCO, VGO, HRO, foots oil, fuel oil, and VisTar streams and the synthesized conducting copolymer comprising a repeat unit of the formula (I)

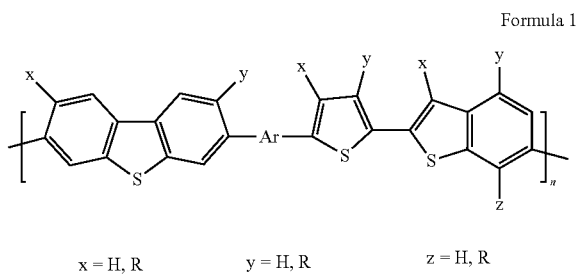

Formula 1 x = H, R      y = H, R      z = H, R wherein R is alkyl/alicyclic chain substituents, and Ar is the higher aromatic rings.

In another embodiment of the present disclosure, wherein a new type/class of conducting copolymers poly(thiophene-co-benzothiophene-co-dibenzothiophene) of formula (I) prepared by co-polymerizing of the various SCHAC compounds present in petroleum fractions.

In another embodiment of the present disclosure, wherein the copolymer consists of a sulfur-containing heterocyclic compound is polythiophene, an alkylated/alicyclic derivative of polythiophene, or an alkylated/alicyclic derivative of polybenzothiophene, an alkylated/alicyclic derivative of polydibenzothiophenes and other sulfur-containing higher aromatic conducting copolymers.

In another embodiment of the present disclosure, wherein copolymers have molecular weight (Mn) ranges from 500 to 58000.

In another embodiment of the present disclosure, wherein yield of the copolymers ranges from 1.75 to 25.2%.

In another embodiment of the present disclosure, wherein the sulfur content of the polymers ranges from 0.03 to 0.25.

In another embodiment of the present disclosure, the present disclosure discloses a process for preparation of organic solvent-soluble functionally active copolymer, wherein said organic solvent-soluble functionally active copolymer (Formula 1) is prepared by the process comprising the steps of:
(a) crude oil (API-18)/refinery fractions is taken in a two-necked round bottom flask, and $FeCl_3$ powder as catalyst is added through a funnel.
(b) The mixture is stirred at 70° C. for 12 hours. After 12 hours, hexane is added to this reaction mixture, and the resultant product polymer (formula 1) is separated by centrifugation and dried under vacuum at room temperature.

In another embodiment of the present disclosure, wherein the copolymers exhibit absorbance in the region from 200-600 nm and fluorescence in the region from 400-700 nm.

In another embodiment of the present disclosure, wherein the copolymers are soluble in various organic solvents such as Toluene, DCM, $CHCl_3$, THF, DMF, dioxane, tetrachloroethylene, DMSO, and methanol.

BRIEF DESCRIPTION OF THE DRAWINGS

The disclosure has other advantages and features which will be more readily apparent from the following detailed description of the disclosure and the appended claims, when taken in conjunction with the accompanying drawings, in which:

FIG. 1: $^1$H NMR spectra of the gasoline and the P6 obtained after polymerization of the gasoline fraction FIG. 2: $^1$H NMR spectra of LCO and P9 obtained after polymerization of the LCO fraction FIG. 3 FT-IR spectra of all polymers FIG. 4 GPC chromatogram of all polymers and separated fractions FIG. 7: Cyclic voltammograms of all polymers FIG. 8: TGA and DTA curves of P6 and P8

DETAILED DESCRIPTION

Figure 4:
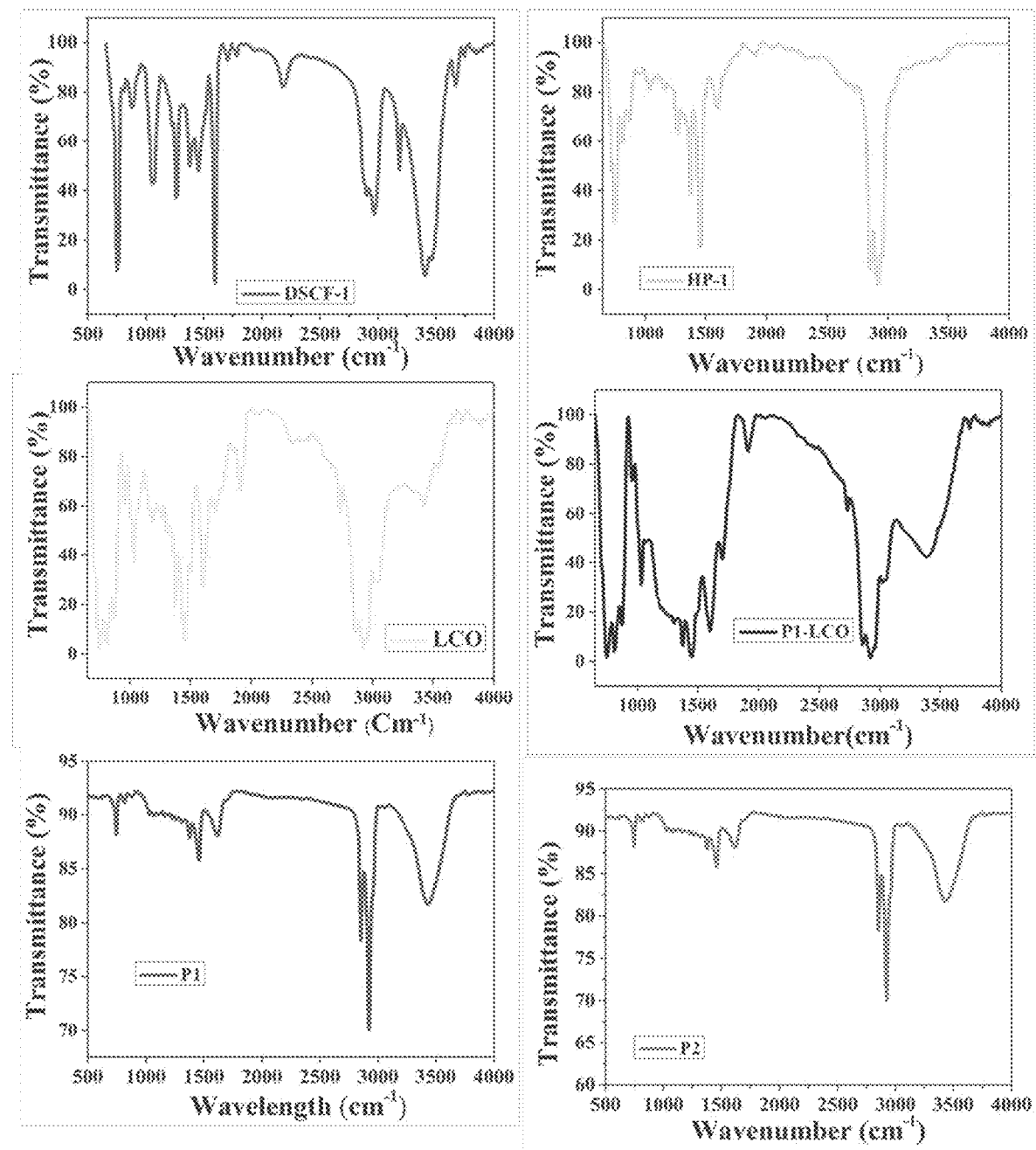

While the disclosure has been disclosed with reference to certain embodiments, it will be understood by those skilled in the art that various changes may be made and equivalents may be substituted without departing from the scope of the disclosure. In addition, many modifications may be made to adapt to a particular situation or material to the teachings of the disclosure without departing from its scope.

Throughout the specification and claims, the following terms take the meanings explicitly associated herein unless the context clearly dictates otherwise. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein.

The present disclosure emphasizes to provide a new family of conducting copolymers, namely poly (thiophene-co-benzothiophene-co-dibenzothiophene), with or without alkyl/alicyclic substituted derivatives, referred to hereafter in this document as Copoly-SCHAC, from petroleum crude oil of different sweetness and refinery fractions such as naphtha, gasoline, kerosene, diesel, LCO, VGO, HRO, foot oil, fuel oil, and VisTar streams.

The present disclosure also emphasizes to provide new conducting polymers that exhibit, high visible light absorbance, excellent fluorescent properties in the visible light region (400-800 nm), and good processability in organic solvents.

The present disclosure additionally emphasizes to provide a process for preparation of Copoly-SCHAC polymers and offer a broader range of solvent processability, and versatility of application.

In line with the above emphasizes, the present disclosure relates to a new class of poly(thiophene-co-benzothiophene-co-dibenzothiophene) based aromatic copolymers and process for preparation thereof.

The present disclosure includes a poly(thiophene-co-benzothiophene-co-dibenzothiophene) comprising repeating units of the formula (I):

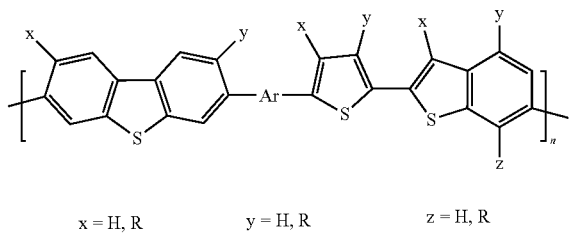

x = H, R  y = H, R  z = H, R wherein R— represents alkyl/alicyclic chain substituents, and Ar— represents one or more aromatic rings.

In another embodiment, the present disclosure provides a new type/class of conjugated copolymers of thiophene, benzothiophene, dibenzothiophene, and higher analogs of sulfur monomers functionalized with alkyl/alicyclic side-chain substituents of formula (I).

The present disclosure also provides a functionally active copolymer poly(thiophene-co-benzothiophene-co-dibenzothiophene) obtained from petroleum crude oil and refinery fractions such as naphtha, gasoline, kerosene, diesel, LCO, VGO, HRO, foots oil, fuel oil, and VisTar streams.

Figure 5:
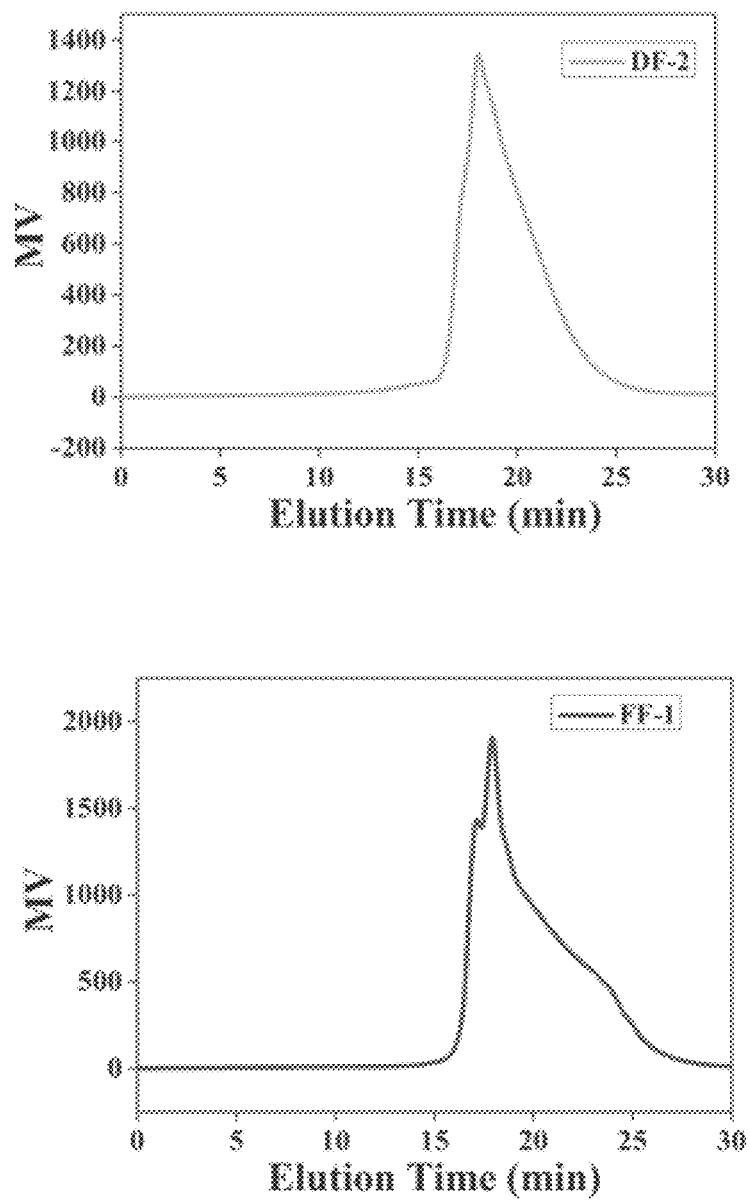
FIG. 5: Absorption spectra of petroleum polymers (P1 and P2) obtained from crude oils of API-26, and 40, Absorption spectra of petroleum fractions and polymers (P9, P10, and P14) obtained from the LCO, VGO, and VisTar fractions
Figure 5:
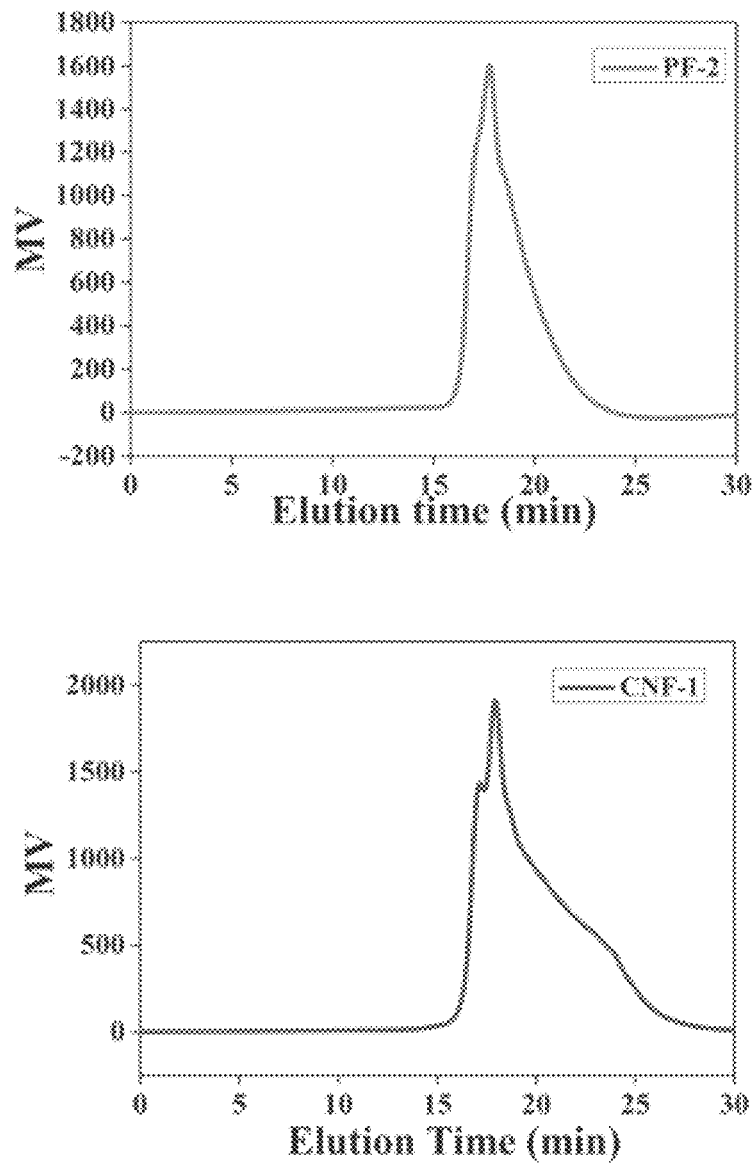
Figure 6:
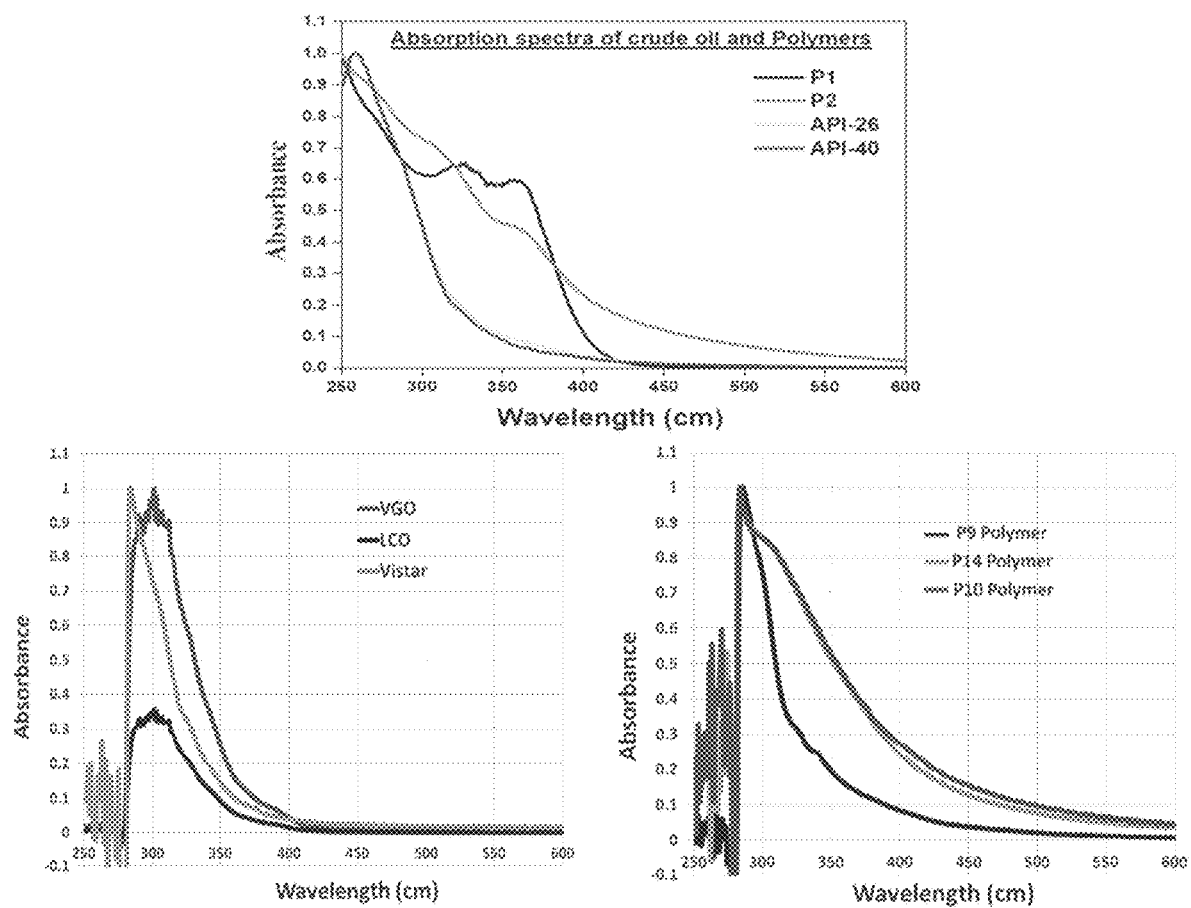
FIG. 6: Fluorescence spectra of the polymers at different wavelengths

The functionally active copoly-SCHACs are structurally characterized by various analytical techniques such as NMR, FT-IR, molecular weight measurements by GPC, UV, fluorescence spectral analysis, and cyclic voltammetry. The Figures from 1-12 illustrate the characterizations by analytical techniques of all the polymers. The synthesis of the Copoly-SCHACs from various petroleum crude oil and refinery fractions are described in examples 1 to 14. The synthesized polymers are structurally characterized with the help of NMR and FT-IR analytical techniques. The FT-IR spectra of synthesizing polymers presented in FIG. 3 show the vibration stretching frequency of the C—S bond at 710 $nm^{-1}$. The molecular weight, the yield of polymers, sulfur content analysis, are listed in Table-1. The petroleum crude oil and refinery fractions have weaker absorption and emission beyond 300 nm, whereas the synthesized polymers have excellent absorption beyond 400 (FIG. 5) and emission in the range of 400-700 nm (FIG. 6). The visible light absorption and excellent emission properties of the polymers (P1-P14) reveal the materials' potentiality as functionally active materials (FIG. 7).

The thermal stability of P6 and P8 polymers are analyzed and given in FIG. 8. Thermogravimetric analysis (TGA) shows the stability of polymers up to 150° C. is <10 wt % degradation. In the temperature region from 150° C. to 350° C., the polymer degrades to 50 wt % by weight percentage. The thermal stability of poly(3-hexyl thiophenes) (P3HT), poly(benzothiophenes) (PBT), and poly(dibenzothiophenes) (PDBT) are excellent (<10 wt %) up to 350° C. The polymers presented in this disclosure are a combination of thiophene, benzothiophene, dibenzothiophene, and other aromatic units randomly distributed in the polymeric chain along with alkyl substituents at various positions on these aromatic rings. The presence of relatively labile alkyl units appear to be the primary contributor to decreased thermal stability of these new materials as compared with commercial available homopolymers P3HT, PBT, and PDBT. However, for ambient temperature operations going up to approximately 150° C., the various functional capabilities of the copoly-SCHAC family offer specific distinct advantages over existing commercial polymers in electronic and optical properties as well as in compounding or blending with other polymeric materials.

The absorption and emission spectra of the copoly-SCHAC polymers are compared with pure P3HT, PBT, and PDBT; it is found that pure P3HT, PBT, and PDBT have broader absorption up to 500 nm and emission extended beyond 750 nm, but the polymers presented in this disclosure have absorption up to 450 nm and emission spectra extended up to 650 nm. The absorption and emission behavior of P1-P14 are different due to the source of crude used and the effect of non-conjugated segments attached to the polymer, enabling a broad family of novel materials from which tailored options can be selected to service specific application requirements.

EXAMPLES

The following examples, which include preferred embodiments, will serve to illustrate the practice of this disclosure, it being understood that the particulars shown are by way of example and for purpose of illustrative discussion of preferred embodiments of the disclosure.

Example 1: Poly(Thiophene-Co-Benzothiophene-Co-Dibenzothiophene) (P1) from Crude Oil of API Gravity 40

20 g of crude oil (API-40) was taken in a two-necked round bottom flask, and 1 g of $FeCl_3$ powder as catalyst was added through a funnel. The mixture was stirred at 60° C. for 12 hours. The resultant polymer was separated by centrifugation and dried under a vacuum at room temperature. This polymer was designated as P1. The yield and molecular weight of the polymer P1 are given in Table-1, and proton NMR, FT-IR, GPC, UV and fluorescence, and CV are shown in FIGS. 1-8.

TABLE 1

Summary of petroleum crude oils, reaction parameters, polymer yields, molecular weight, and sulfur content analysis

| S. NO. | Name of Sample | Quantity of feed sample (g) | Dosages of Catalyst (g) | Reaction on time (h) | Temperature (° C.) | Polymer Yields (g) | GPC Mn | GPC Mw | PDI | Sulfur Content (%) |
|---|---|---|---|---|---|---|---|---|---|---|
| 1. | P2 | 20 | 0.01 | 12 | 70 | 2.1 | 4567 | 6542 | 1.43 | 0.047 |
| 2. | P4 | 20 | 1 | 12 | 70 | 7.56 | 58060 | 120526 | 2.075 | 0.216 |
| 3. | P5 | 20 | 1 | 12 | 70 | 1.49 | Not detectable | | | 0.033 |
| 4. | P6 | 20 | 1 | 12 | 70 | 0.35 | 988 | 1049 | 1.06 | 0.056 |
| 5. | P8 | 20 | 1 | 12 | 70 | 0.45 | 1204 | 1391 | 1.15 | 0.096 |
| 6. | P9 | 20 | 1 | 12 | 70 | 1.4 | Not detectable | | | 0.033 |

Example 2: Poly(Thiophene-Co-Benzothiophene-Co-Dibenzothiophene) (P2) from Crude Oil of API Gravity 26

20 g of the crude oil (API-26) was taken in a two-necked round bottom flask, and 1 g of $FeCl_3$ powder as catalyst was added through a funnel. The mixture was stirred at 70° C. for 12 hours. After 12 hours, hexane was added to the reaction mixture, and the resultant product polymer was separated by centrifugation and dried under vacuum at room temperature. This polymer was designated as P2. The yield and molecular weight of the polymer P2 are given in Table-1, and proton NMR, FT-IR, GPC, UV and fluorescence, and CV are shown in FIGS. 1-8.

Example 3: Poly(Thiophene-Co-Benzothiophene-Co-Dibenzothiophene) (P3) from Crude Oil of API Gravity 18

20 g of the crude oil (API-18) was taken in a two-necked round bottom flask, and 1 g of $FeCl_3$ powder as catalyst was added through a funnel. The mixture was stirred at 70° C. for 12 hours. After 12 hours, hexane was added to this reaction mixture, and the resultant product polymer (P3) was separated by centrifugation and dried under vacuum at room temperature. The yield and molecular weight of the polymer P3 are given in Table-1, and proton NMR, FT-IR, GPC, UV and fluorescence, and CV are shown in FIGS. 1-8.

Example 4: Poly(Thiophene-Co-Benzothiophene-Co-Dibenzothiophene) (P4) Using Crude Oil of API Gravity 15

20 g of the crude oil (API-15) was taken in a two-neck round bottom flask, and 1 g of $FeCl_3$ powder as catalyst was added through a funnel. The mixture was stirred at 70° C. for 12 hours. After 12 hours, hexane was added to this reaction mixture, and the resultant polymer was separated by centrifugation and dried under vacuum at room temperature. This polymer was designated as P4. The yield and molecular weight of the polymer P4 are given in Table-1, and proton NMR, FT-IR, GPC, UV, fluorescence, and CV are shown in FIGS. 1-8.

Example 5: Poly(Thiophene-Co-Benzothiophene-Co-Dibenzothiophene) (P5) Using a Petroleum Naphtha Fraction 20 g of the naphtha fraction (boiling range of 30-90° C.) was taken in a two-necked round bottom flask. The flask was filled with a nitrogen atmosphere, and 1 g of $FeCl_3$ powder as catalyst was added through a funnel. The mixture was stirred at 25° C. for 12 hours. The contents were cooled, and the product polymer (P5) was separated by centrifugation and dried under vacuum at room temperature. The yield and molecular weight of the polymer P5 are given in Table-1, and proton NMR, FT-IR, GPC, UV and fluorescence, and CV are shown in FIGS. 1-8.

Example 6: Poly(Thiophene-Co-Benzothiophene-Co-Dibenzothiophene) (P6) Using a Petroleum Gasoline Fraction 20 g of the gasoline fraction (boiling range of 80-90° C.) was taken in the two-necked round bottom flask. The flask was filled with nitrogen atmosphere, and 1 g of the $FeCl_3$ powder as catalyst was added through a funnel. The mixture was stirred at 25° C. for 12 hours. The contents were cooled, and the product polymer (P6) was separated by centrifugation and dried under vacuum at room temperature. This polymer was designated as P6. The yield and molecular weight of the polymer P6 are given in Table-1, and proton NMR, FT-IR, GPC, UV and fluorescence, and CV are shown in FIGS. 1-8.

Example 7: Poly(Thiophene-Co-Benzothiophene-Co-Dibenzothiophene) (P7) Using a Petroleum Kerosene Fraction 20 g of a kerosene fraction (boiling range of 200-300° C.) was taken in a two-necked round bottom flask. The flask atmosphere was made inert using nitrogen flushing, to which 1 g of $FeCl_3$ powder as catalyst was added through a funnel. The mixture was stirred at 25° C. for 12 hours. The contents were cooled, and the product polymer (P7) was separated by centrifugation and dried under vacuum at room temperature. The yield and molecular weight of the polymer P7 are given in Table-1, and proton NMR, FT-IR, GPC, UV and fluorescence, and CV are shown in FIGS. 1-8.

Example 8: Poly(Thiophene-Co-Benzothiophene-Co-Dibenzothiophene) (P8) Using a Petroleum Diesel Fraction 20 g of a diesel fraction (boiling range of 150-380° C.) was taken in a two-necked round bottom flask. The flask atmosphere was made inert by nitrogen flushing, to which 1 g of $FeCl_3$ powder as catalyst was added through a funnel. The mixture was stirred at 25° C. for 12 hours. The contents were cooled, and the product polymer (P8) was separated by centrifugation and dried under vacuum at room temperature. The yield and molecular weight of the polymer P8 are given in Table-1, and proton NMR, FT-IR, GPC, UV and fluorescence, and CV are shown in FIGS. 1-8.

Example 9: Poly(Thiophene-Co-Benzothiophene-Co-Dibenzothiophene) (P9) Using a LCO Fraction 20 g of the LCO fraction was taken in a two-neck round bottom flask. The flask atmosphere was made inert by nitrogen. To this, 1 g of $FeCl_3$ powder as catalyst was added through a funnel. The mixture was stirred at 25° C. for 12 hours. The contents were cooled, and the product polymer (P9) was separated by centrifugation and dried under vacuum at room temperature. The yield and molecular weight of the polymer P9 are given in Table-1, and proton NMR, FT-IR, GPC, UV and fluorescence, and CV are shown in was given in FIGS. 1-8.

Example 10: Poly(Thiophene-Co-Benzothiophene-Co-Dibenzothiophene) (P10) Using a VGO Fraction 20 g of the VGO fraction was taken in a two-necked round bottom flask. The flask atmosphere was made inert by nitrogen flushing. To this, 1 g of $FeCl_3$ powder as catalyst was added through the funnel. The resulting mixture was stirred at 70° C. for 12 hours. The contents were cooled, and the product polymer (P10) was separated by centrifugation and dried under vacuum at room temperature. The yield and molecular weight of the polymer P10 are given in Table-1, and proton NMR, FT-IR, GPC, UV and fluorescence, and CV are shown in FIGS. 1-8.

Example 11: Poly(Thiophene-Co-Benzothiophene-Co-Dibenzothiophene) (P11) Using a HRO Fraction 20 g of the HRO fraction was taken in a two-necked round bottom flask. The flask was made inert by nitrogen flushing. To this 1 g of FeCl₃ powder as catalyst was added through the funnel. The mixture was stirred at 100° C. for 12 hours. The contents were cooled, and the product polymer (P11) was separated by centrifugation and dried under vacuum at room temperature. The yield and molecular weight of the polymer P11 are given in Table-1, and proton NMR, FT-IR, GPC, UV and fluorescence, and CV are shown in FIGS. 1-8.

Example 12: Poly(Thiophene-Co-Benzothiophene-Co-Dibenzothiophene) (P12) Using a Petroleum Foots Oil Fraction 20 g of the foots oil fraction was taken in a two-necked round bottom flask. The flask was made inert by nitrogen flushing. To this, 1 g of FeCl₃ powder as catalyst was added through the funnel. The resulting mixture was stirred at 70° C. for 12 hours. The contents were cooled, and the product polymer (P12) was separated by centrifugation. The resultant polymer was dried under a vacuum at room temperature. This polymer was designated as P12. The yield and molecular weight of the polymer P12 are given in Table-1, and proton NMR, FT-IR, GPC, UV and fluorescence, and CV are shown in FIGS. 1-8.

Example 13: Poly(Thiophene-Co-Benzothiophene-Co-Dibenzothiophene) (P13) Using a Petroleum Fuel Oil Fraction 20 g of the fuel oil fraction was taken in a two-necked round bottom flask. The flask was made inert by nitrogen flushing to which, 1 g of FeCl₃ powder as catalyst was added through a funnel. The mixture was stirred at 70° C. for 12 hours. The contents were cooled, and the product polymer (P13) was separated by centrifugation and dried under vacuum at room temperature. The yield and molecular weight of the polymer P13 are given in Table-1, and proton NMR, FT-IR, GPC, UV and fluorescence, and CV are shown in FIGS. 1-8.

Example 14: Poly(Thiophene-Co-Benzothiophene-Co-Dibenzothiophene) (P14) Using the Petroleum VisTar Fraction 20 g of the VisTar fraction was taken in a two-necked round bottom flask. The flask was inert by nitrogen flushing to which, 1 g of FeCl₃ powder as catalyst was added through a funnel. The mixture was stirred at 70° C. for 12 hours. The contents were cooled, and the product polymer (P14) was separated by centrifugation and dried under vacuum at room temperature. This polymer was designated as P14. The yield and molecular weight of the polymer P14 are given in Table-1, and proton NMR, FT-IR, GPC, UV and fluorescence, and CV are shown in FIGS. 1-8.

Advantages

The various advantage of the present disclosure is:
1) Desulfurization of petroleum crude oil and refinery fractions via polymerization of sulfur compounds provides an entirely new class of copolymers, namely, poly(thiophene-co-benzothiophene-co-dibenzothiophene) or Copoly-SCHAC.
2) Copoly-SCHAC polymers having excellent conducting or semiconducting characteristics, high visible light absorbance, and broad fluorescence emission properties.
3) Copoly-SCHAC polymers are easy to synthesize and offer a broader range of solvent process ability, and versatility of applications in oil sector.

What is claimed is:

1. A copolymer, poly(thiophene-co-benzothiophene-co-dibenzothiophene), having a formula (I)

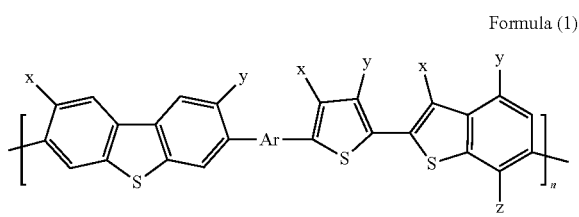

Formula (1)

wherein x=H or R, y=H or R, z=H or R, and n=500-58000,
wherein R is selected from alkyl or alicyclic chain substituents, and Ar is an aromatic ring.

2. The copolymer as claimed in claim 1, wherein the copolymer exhibits absorbance in a region from 200-600 nm and fluorescence in a region from 400-700 nm.

3. The copolymer as claimed in claim 1, wherein the copolymer is soluble in an organic solvent, and is functionally active.

4. The copolymer as claimed in claim 3, wherein the organic solvent is selected from the group consisting of toluene, DCM, CHCl₃, THF, DMF, dioxane, tetrachloroethylene, DMSO, and methanol.

5. The copolymer as claimed in claim 1, wherein the copolymer further comprises one or more sulfur-containing heterocyclic compounds, wherein the sulfur-containing heterocyclic compound is selected from the group consisting of polythiophene, an alkylated or alicyclic derivative of polythiophene, an alkylated or alicyclic derivative of polybenzothiophene and an alkylated or alicyclic derivative of polydibenzothiophenes.

6. The copolymer as claimed in claim 1, wherein sulfur content of the copolymer is in a range of 0.03% to 0.25%.

7. A process for preparing the copolymer according to claim 1, the process comprising:
i. charging petroleum crude oil or petroleum refinery fraction in a two-necked round bottom flask;
ii. adding FeCl₃ powder as a catalyst through a funnel to form a mixture;
iii. stirring the mixture at 70° C. for 12 hours;
iv. adding hexane to the mixture; and
v. separating the copolymer by centrifugation of the mixture; and
vi. drying the copolymer under vacuum at room temperature.

8. The process as claimed in claim 7, wherein yield of the copolymer ranges from 1.75 to 25.2%.

9. The process as claimed in claim 7, wherein the crude oil is petroleum crude oil or petroleum refinery fraction.

10. The process as claimed in claim 9, wherein the petroleum crude oil is selected from the group consisting of crude oil of API Gravity 40, crude oil of API Gravity 26, crude oil of API Gravity 18 and crude oil of API Gravity 15.

11. The process as claimed in claim 9, wherein the petroleum refinery fraction is selected from the group consisting of naphtha, gasoline, kerosene, diesel, LCO, VGO, HRO, foots oil, fuel oil, and VisTar streams and mixture thereof.

* * * * *